H. J. BERY.
VALVE.
APPLICATION FILED SEPT. 9, 1918.

1,334,073.

Patented Mar. 16, 1920.

WITNESSES:

C. S. Bryant

INVENTOR

Henry J. Bery

UNITED STATES PATENT OFFICE.

HENRY J. BERY, OF DETROIT, MICHIGAN, ASSIGNOR OF ONE-HALF TO ELLSWORTH S. BRYANT, OF DETROIT, MICHIGAN.

VALVE.

1,334,073.   Specification of Letters Patent.   Patented Mar. 16, 1920.

Application filed September 9, 1918. Serial No. 253,182.

*To all whom it may concern:*

Be it known that I, HENRY J. BERY, a citizen of the United States, and residing at Detroit, in the county of Wayne and State of Michigan, have invented a new and Improved Valve, of which the following is a specification.

This invention relates to valves of the puppet type adapted to be lifted from their seats by the pressures of fluids and returned to their seats by gravity and the force of springs, and its object is to provide adjustable means to limit the movement of the valves under normal conditions and thereby reduce to a minimum the sound caused by the valves striking their seats. A further object of this invention is to provide the means for limiting the normal lift of puppet valves with a yieldable positioning device which will permit additional movements under extraordinary conditions.

This invention consist in a puppet valve and a casing therefor, resilient means to normally hold the valve on its seat but permit it to lift from its seat under predetermined fluid pressures, together with an adjustable abutment or stop to limit the movement of the valve. It also consists in a mounting for the abutment or stop which may be operated from the outside of the machine within which the valve and its casing are mounted. It further consists in so constructing this abutment or stop that it will yield under extraordinary fluid pressures and thereby permit the valve to move through increased distances.

This invention further consists in providing a cylindrical valve casing with a circumferential flange and with packing rings on each side of said flange, the flange and the rings serving to form fluid tight joints between the two parts of the machine which contain the passages of the fluid which is to be controlled by the valve, and the valve casing being fitted into cylindrical recesses in said members so as to position them.

Figure 1:
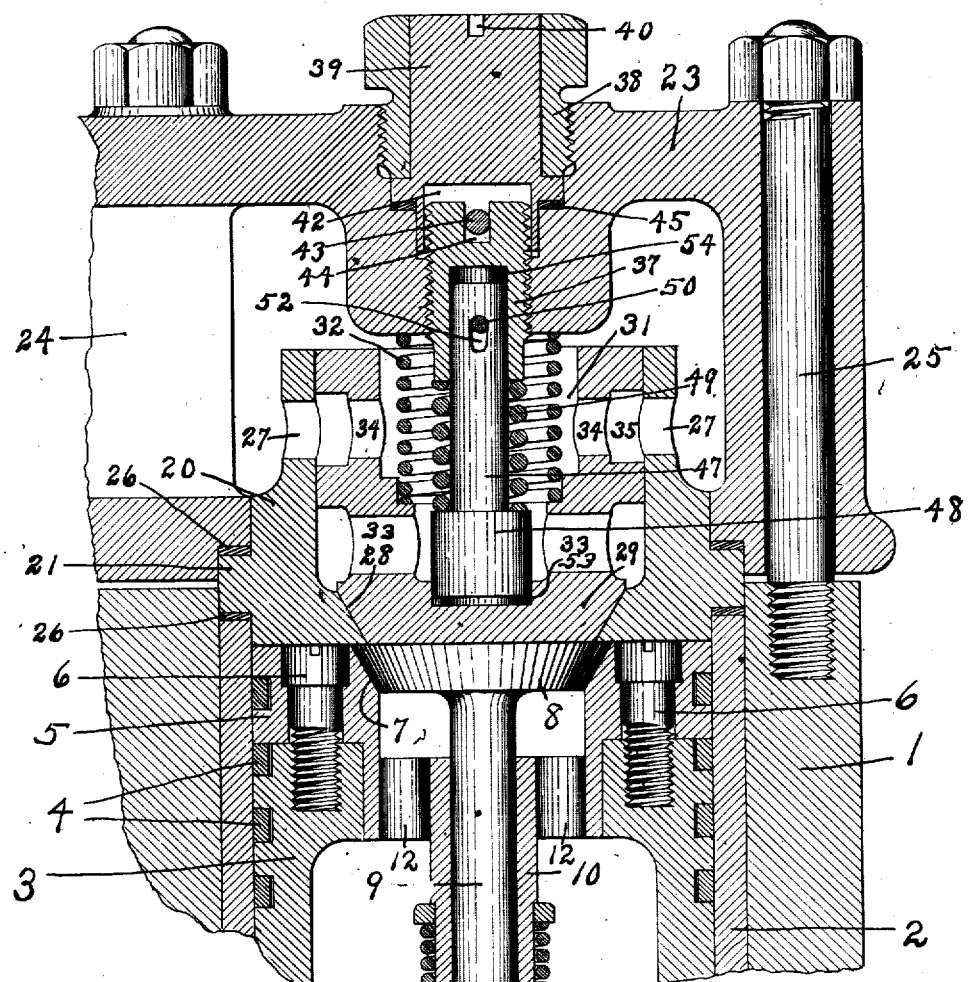
Figure 2:
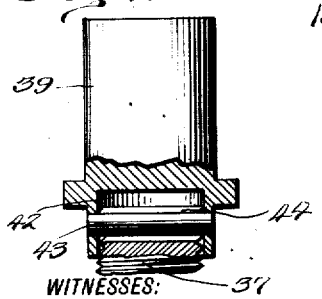

In the accompanying drawing Figure 1 is a central section of the valve casing and the valve therein and a section of the two members which are joined by the valve casing, the two members being substantially the cylinder and the cylinder-head of the compressor shown in my prior application No. 221,814, filed March 11, 1918. Fig. 2 is an elevation of the rotatable valve adjusting member, part being broken away to show the pin connecting it to the abutment.

The cylinder 1 is shown provided with a lining 2 within which is slidable a piston 3, having rings 4 and a head 5 secured in position by means of screws 6. The head 5 is provided with a seat 7 for the valve 8 whose stem 9 is guided by a sleeve 10 extending down from the head 5. Passages 12 are formed in the head for the fluids to be compressed or pumped. A collar 13 is threaded onto the stem 9 and is prevented from turning after being positioned by the cotter pin 14. This collar receives the thrust of the spring 15 and thus normally holds the valve 8 onto its seat.

A valve casing 20 has a circumferential flange 21 which preferably rests on the lining 2 of the cylinder and is of the same diameter, the lower end of the casing preferably fitting within the lining. This flange also fits a recess in the cylinder head 23 which has a discharge passage 24, the end of which is preferably counterbored to receive the valve casing. The head may be secured to the cylinder by means of bolts 25, and rings 26 of any desired packing may be placed above and below the flange 21 to prevent leakage. When this valve is used in ammonia-gas compressors these rings will preferably be of lead. The casing is formed with discharge passages 27 and with a seat 28 for the valve 29.

This valve is also of the puppet type and is slidable within the casing 20. It has a central chamber 31 in which the spring 32 is mounted to press the valve onto its seat and with passages 33 and 34 communicating therewith, the passages 34 also joining the circumferential passage 35 which connects to the passages 27 in the casing. The cylinder head is formed with a recess coaxial with the valve chamber and the ends thereof are threaded to receive the abutment 37 and the locking sleeve 38. Within the locking sleeve is mounted the rotatable member 39 which is formed with a transverse slot 40 to receive a tool by means of which it may be turned. The abutment 37 extends up into a pocket 42 in this member 39 and a pin 43 mounted in this member extends across in the slot 44 in the abutment. A packing ring 45 is placed between shoulders on the member 39 and the cylinder head to prevent leakage.

A stem 47 extends up into a recess in the abutment 37 and has a head 48 that extends into a recess in the valve. A stiff spring 49 normally holds down the stem against the pin 50 that extends across through a slot 52 in the stem.

Under normal conditions and speeds of the piston, the valve 29 will be lifted from its seat at each compression or discharge stroke of the piston, the lift of the valve being limited by the stem 47. The stem however will yield when an excess of fluid is forced upward by the piston before breakage can occur. This is especially valuable in compressors for ammonia gas where normally nothing but the gas passes through the compressor and where at such times the discharge valve need have but little lift. At times however, comparatively large amounts of liquid ammonia pass through the compressor and a larger valve lift is necessary. The object of having the stem 47 limit the valve is to reduce to a minimum the clicking noise so often heard where valves have excessive movements.

In order to even further reduce the sounds usually caused by valves striking against their stops the valve 29 may be formed with a recess 53 to receive the head 48 on the stem 47. This recess will be of such a diameter that it will act as a dash pot and cushion the valve. In the same way the upper end of this stem may be similarly cushioned in the recess 54 in the abutment 37.

The normal maximum lift of the valve 29 is determined by unscrewing the sleeve 38 a turn or two to free the rotatable member 39, which may now be turned to adjust the abutment 37 and with it the stem 47. The sleeve 38 is then screwed down tight to lock the member 39 from turning.

The details and proportions of this construction may all be changed without departing from the spirit of my invention as set forth in the follows claims.

I claim:

1. The combination of a plurality of recessed members, one above the other, a valve casing mounted in recesses in said members, a puppet valve vertically slidable in said casing, the upper member having another recess in vertical alinement with the valve which recess is threaded at both ends, an abutment screw-threaded in the lower end of the recess, a locking sleeve screw threaded in the upper end of the recess, a rotatable member extending through said locking sleeve to position the abutment, and a stem extending down from the abutment to limit the movement of the valve.

2. The combination of a plurality of recessed members, one above the other, a valve casing mounted in recesses in said members, a puppet valve vertically slidable in said casing, the upper member having another recess in vertical alinement with the valve, which recess is threaded at both ends, an abutment screw-threaded in the lower end of the recess, a locking sleeve screw-threaded in the upper end of the recess, a rotatable member extending through said locking sleeve to position the abutment, a stem vertically slidable in said abutment and extending down to limit the movement of the valve and a spring on said stem to normally prevent it from being lifted by the valve.

3. The combination of a cylinder and a head therefor, a valve casing mounted between them, a puppet valve slidable vertically in said casing, an abutment screw threaded in said head to limit the movement of the valve, a rotatable member mounted in said head and extending to the outside thereof and having a slidable connection with said abutment, and means to lock the rotatable member from turning.

4. The combination of a cylinder and head therefor, a valve casing mounted between them, a puppet valve slidable in the casing, an abutment screw-threaded in said head, means extending to the outer surface of the head whereby the abutment may be turned, a stem slidably mounted in said abutment, a spring to hold the stem toward the valve to limit the movement thereof, and a second spring engaging the valve and the abutment to restrain the movement of the valve.

5. The combination of a cylinder and a head therefor, a valve casing mounted between them, a puppet valve slidable in the casing, an abutment screw-threaded in the head, an adjustable member for said abutment rotatably mounted in said head with an end extending to the outer surface thereof, and means constantly accessible from without the head for locking said rotatable adjusting member.

6. The combination of a cylinder and a head therefor, a valve casing mounted between them, a puppet valve slidable in the casing, an abutment screw-threaded in the head, an adjusting member for said abutment rotatably mounted in said head with an end extending to the outer surface thereof, and means constantly accessible from without the head for locking said rotatable adjusting member, a slidable stem carried by said abutment, and a spring on said stem to hold it toward said valve.

HENRY J. BERY.